US008687914B2

(12) United States Patent
Chen

(10) Patent No.: US 8,687,914 B2
(45) Date of Patent: Apr. 1, 2014

(54) METHOD OF PRODUCING AN IMAGE

(75) Inventor: Chi-De Chen, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 709 days.

(21) Appl. No.: 12/904,091

(22) Filed: Oct. 13, 2010

(65) Prior Publication Data

US 2012/0093435 A1 Apr. 19, 2012

(51) Int. Cl.
*G06K 9/40* (2006.01)
(52) U.S. Cl.
USPC ............................ 382/274; 382/103; 382/294
(58) Field of Classification Search
USPC ........................................ 382/103, 294, 274
See application file for complete search history.

(56) References Cited

U.S. PATENT DOCUMENTS

| 4,531,189 | A | * | 7/1985 | Mosier et al. ..................... 702/9 |
| 5,861,910 | A | * | 1/1999 | McGarry et al. ................. 348/87 |
| 5,990,444 | A | * | 11/1999 | Costin ....................... 219/121.69 |
| 6,990,255 | B2 | * | 1/2006 | Romanik et al. ............... 382/284 |
| 8,000,521 | B2 | * | 8/2011 | Kira ................................ 382/154 |
| 2002/0012463 | A1 | * | 1/2002 | Yamada ......................... 382/167 |
| 2003/0095178 | A1 | * | 5/2003 | Shibayama ...................... 348/46 |
| 2005/0226464 | A1 | * | 10/2005 | Sun et al. ....................... 382/103 |
| 2006/0033823 | A1 | * | 2/2006 | Okamura ........................ 348/254 |
| 2007/0242162 | A1 | * | 10/2007 | Gutta et al. .................... 348/645 |
| 2008/0221747 | A1 | * | 9/2008 | Baumann et al. ............... 701/29 |
| 2009/0314751 | A1 | * | 12/2009 | Manens et al. ............. 219/121.69 |
| 2010/0014707 | A1 | * | 1/2010 | Nakamori et al. ............. 382/103 |
| 2010/0097476 | A1 | * | 4/2010 | Marks ............................ 348/169 |
| 2010/0309016 | A1 | * | 12/2010 | Wendt et al. .............. 340/825.22 |

FOREIGN PATENT DOCUMENTS

| CN | 101369414 A | 2/2009 |
| CN | 101631189 A | 1/2010 |
| JP | 2004297754 A | 10/2004 |
| JP | 2010148113 A | 7/2010 |
| KR | 1020040106398 A | 12/2004 |
| KR | 1020090088325 A | 8/2009 |
| TW | 200521884 A | 7/2005 |

OTHER PUBLICATIONS

Bilateral filtering for Gray and Color images, Tomasi et al., IEEE, 1998, pp. 839-846.*
Perception of biological—motion., Beintema et al., PNAS vol. 99 No. 8., Apr. 16, 2002, pp. 5661-5663.*
Tomasi and Manduchi. "Bilateral Filtering for Gray and Color Images." Computer Science Department, Stanford University, Stanford, CA.

* cited by examiner

Primary Examiner — Jayesh A Patel
(74) *Attorney, Agent, or Firm* — Rabin & Berdo, P.C.

(57) ABSTRACT

A method of producing an image is disclosed. At least one symbol is received. A first image with at least one light spot is, optionally, captured by an image capturing apparatus. The performing order of receiving the symbol and capturing the first image may be reversed. The first image is duplicated to provide a plurality of duplicated first images, and the duplicated first images are shifted according to the symbol to obtain a plurality of shifted first images. The brightness values of corresponding pixels of the shifted first images are computed to produce a second image with a light track that traces the symbol.

20 Claims, 8 Drawing Sheets

METHOD OF PRODUCING AN IMAGE

BACKGROUND OF THE INVENTION

1. Field of the Invention

The present invention generally relates to an imaging method, and more particularly to a method of producing an image with a light track.

2. Description of Related Art

In addition to capturing an image, cameras may be further utilized to create an artistic work by exploiting a variety of functions equipped in modern cameras. Light doodle (or light script) is one such artistic work created by moving the camera during exposure period such that a light spot may become a light track superimposed on a dark background image.

However, not every user can create a favorable light doodle for the reason either that the user is not skillful at mastering the camera or the user's camera is too limited in functions to allow the user to perform light scribing.

For the foregoing reasons, a need has arisen to propose a novel method to automatically create the light doodle according to what the user wants.

SUMMARY OF THE INVENTION

In view of the foregoing, it is an object of the embodiment of the present invention to provide a method of producing an image with a light track that traces at least one symbol. The method may automatically produce the image for the user.

According to a first embodiment, at least one symbol is received, and a first image with at least one light spot is captured by an image capturing apparatus. Subsequently, the first image is duplicated to provide a plurality of duplicated first images, and the duplicated first images are then shifted according to the symbol to obtain a plurality of shifted first images. Finally, the brightness values of corresponding pixels of the shifted first images are computed to produce a second image with a light track that traces the symbol.

According to a second embodiment, the first image is captured before the symbol is received. According to a third embodiment, the first image is pre-provided before the symbol is received.

DETAILED DESCRIPTION OF THE INVENTION

Figure 1:
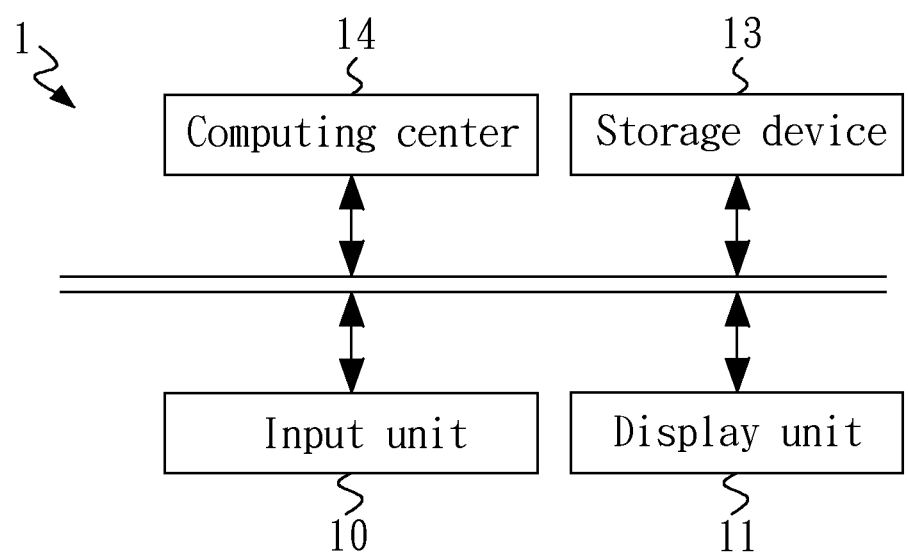
FIG. 1 shows a block diagram of an image capturing device adaptable to the present invention.

FIG. 1 shows a block diagram of an image capturing device 1 adaptable to the present invention for capturing at least one image or video. The image capturing device 1 is used in an embodiment of the present invention to produce an image with a light track that traces at least one symbol. The image capturing device 1 may be embedded in an electronic device such as a camera, a digital still camera (DSC), a digital video (DV), a mobile phone, a video camcorder, an MP3 player, a personal digital assistant (PDA) or a webcam.

Referring to FIG. 1, the image capturing device 1 primarily includes an input unit 10, a display unit 11, a storage device 13, and a computing center 14. Specifically, the input unit 10 may be used to input at least one symbol and may generally be a human input device (HID) such as a touch panel, a graphics tablet, a pointing device or a keyboard. The display unit 11 may be used in the embodiment to display the image and the symbol. The display unit 11 may be, but is not limited to, a liquid crystal display (LCD) or an organic light emitting diode (OLED) display. Furthermore, the input unit 10 and the display unit 11 may be combined, for example, to form a touch screen. The storage device 13 may be used to store the symbol, the image, or the video; wherein the symbol may be inputted from the input unit 10 or pre-stored in the storage device 13 beforehand, and the image and the video may be captured by an image capturing apparatus 2 or pre-stored in the storage device 13 beforehand. The storage device 13 may be built-in the image capturing device 1, such as a hard disk drive or a memory device, or a removable storage, such as a memory card, a secure digital (SD) card, or a multimedia card (MMC). The computing center 14 may be used to process signals of the symbol, the image, and the video, such as a central processing unit (CPU) or digital signal processor (DSP).

Figure 2:
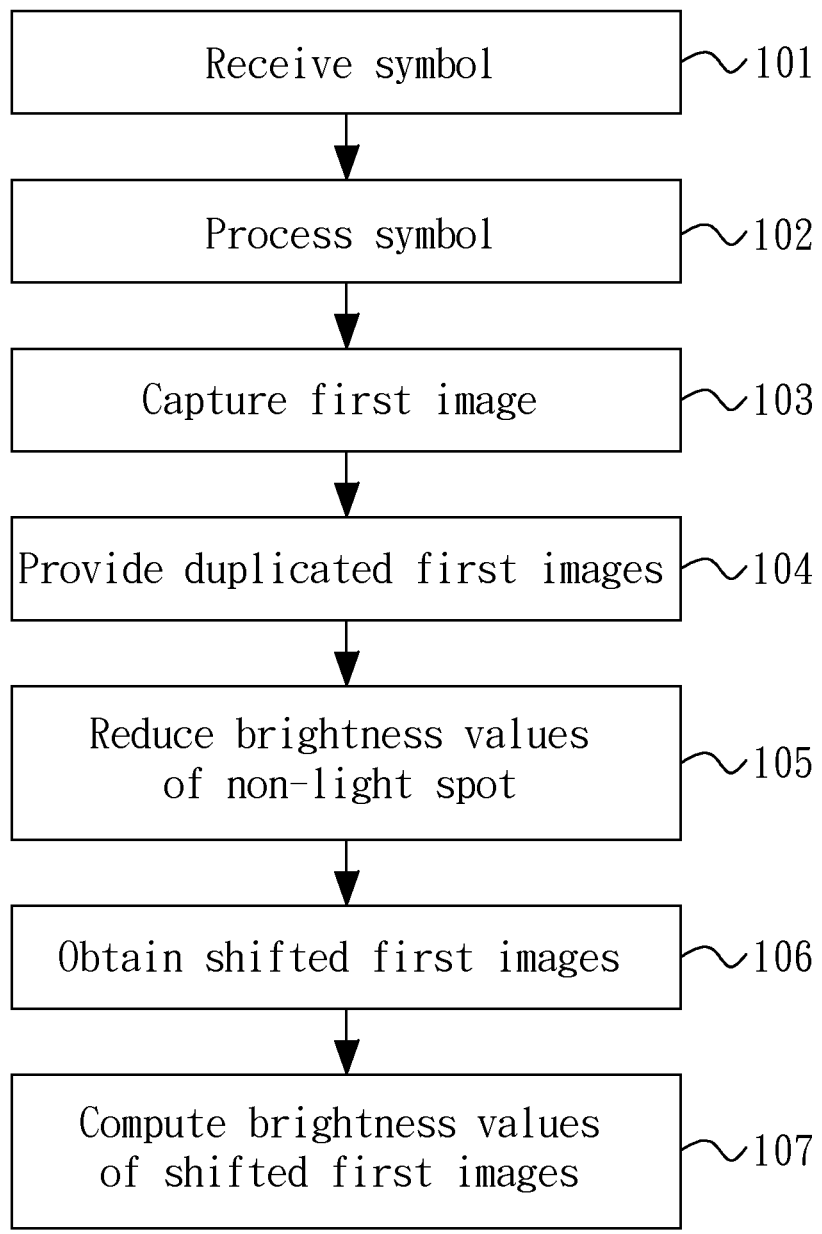
FIG. 2 shows a flow diagram illustrating a method of producing an image according to a first embodiment of the present invention.
Figure 3A:
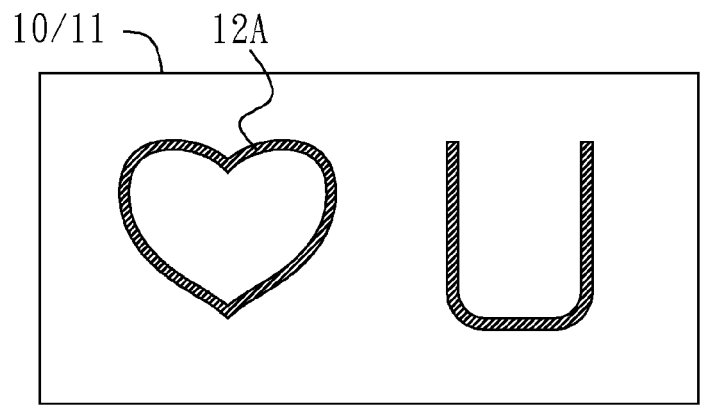
FIG. 3A shows a symbol is displayed on a display unit.

Referring to FIG. 1, FIG. 2, and FIG. 3A, FIG. 2 shows a flow diagram illustrating a method of producing an image according to a first embodiment of the present invention. FIG. 3A shows a symbol 12A is displayed on the display unit 11. The image capturing device 1 as shown in FIG. 1 is adaptable to the flow diagram of FIG. 2. Specifically speaking, in step 101, the symbol 12A is inputted from the input unit 10 or received from the storage device 13 may be displayed on the display unit 11. As described above, the input unit 10 and the display unit 11 may be combined in a touch screen.

Referring to FIG. 2 and FIG. 3A, in step 102, the symbol 12A may be performed a signal processing by the computing center 14 for modifying rugged line-segments of the symbol 12A and turn into smoothly. For example, the computing center 14 performs a low-pass filtering, a band-pass filtering finite impulse response (FIR), or infinite impulse response (IIR) on the symbol 12A as the signal processing.

Figure 3B:
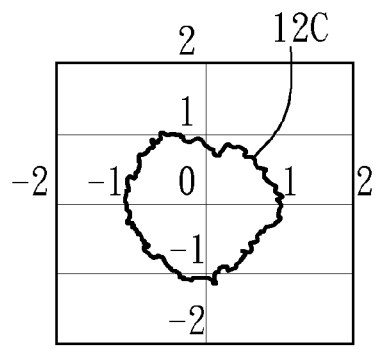
FIG. 3B shows a raw symbol before performing signal processing.
Figure 3C:
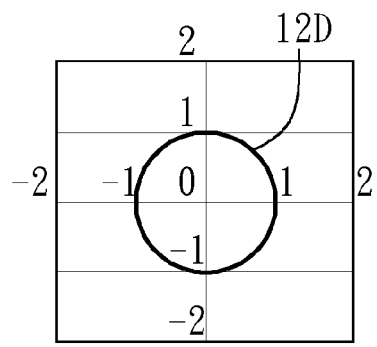
FIG. 3C shows a modified symbol after performing the signal processing.

Referring to FIG. 3B and FIG. 3C, FIG. 3B shows a raw symbol 12C before performing the signal processing of step 102. The raw symbol 12C is a rugged circle centered at (0,0) with a radius of about 1. The raw symbol 12C may be inputted by the input unit 10 or received from the storage device 13. FIG. 3C shows a modified symbol 12D after performing the signal processing of step 102 by subjecting the raw symbol 12D to the low-pass filtering by the computing center 14. The modified symbol 12D has a smoothened circumference centered at (0,0) with a radius of 1.

Referring to FIG. 1 and FIG. 2, in step 103, a first image is captured by the image capturing device 1. The first image has at least one light spot includes at least one pixel with a brightness value which greater than brightness values of other non-light spot portion of the first image.

Referring to FIG. 2, in step 104, the first image is duplicated to provide a plurality of duplicated first images. Before proceeding to the following steps, the brightness values of pixels of portions of each duplicated first image may be adjusted in step 105. For example, the brightness values of pixels of non-light spot portion are reduced while the brightness values of pixels of the light spot are maintained. Accordingly, the brightness values do not overflow after performing the next step.

Figure 4A:
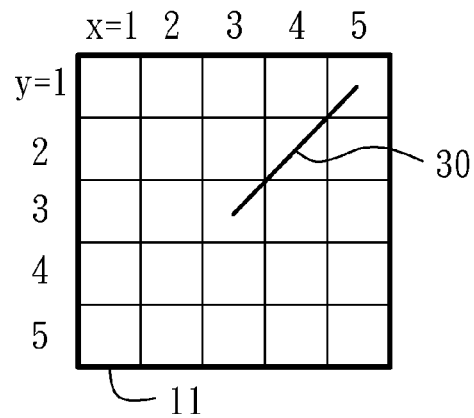
FIG. 4A illustrates an exemplary symbol shown on a display unit.
Figure 4B:
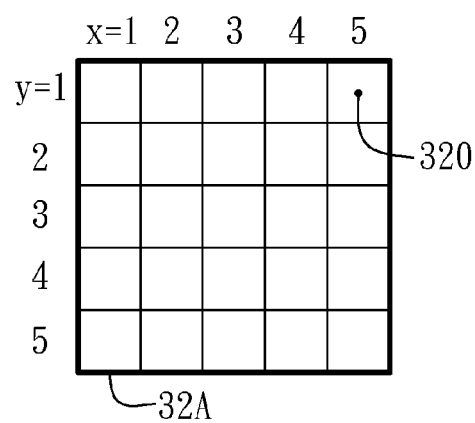
FIG. 4B shows a captured first image with a light spot.
Figure 4C:
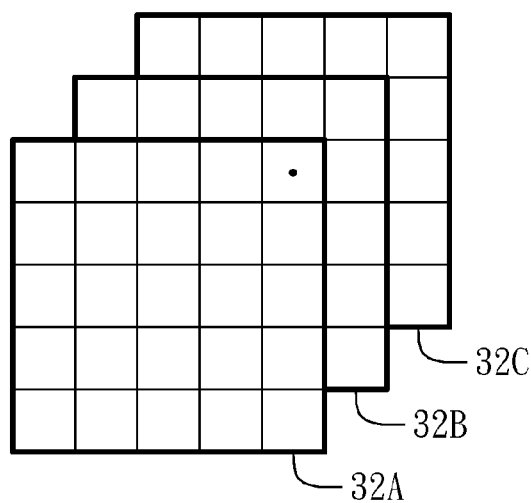
FIG. 4C shows three shifted first images in an overlapping viewpoint.
Figure 4D:
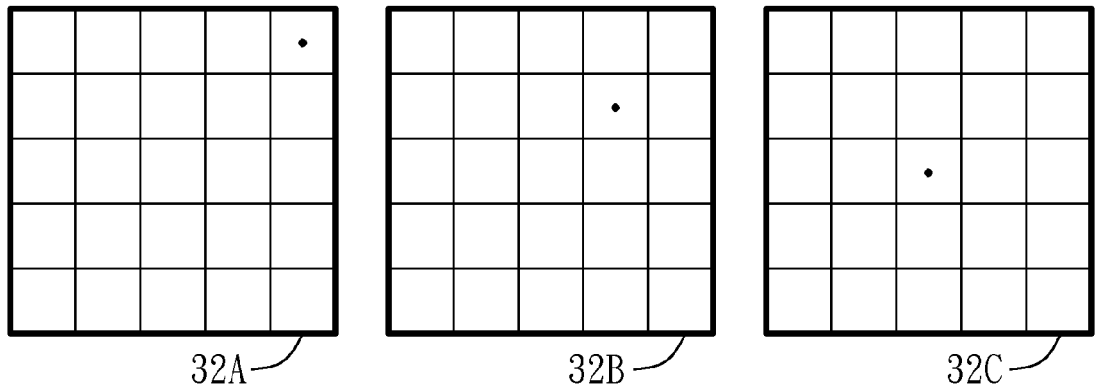
FIG. 4D shows three shifted first images in a non-overlapping viewpoint.

Still referring to FIG. 2, the duplicated first images are shifted respectively by transforming coordinates of the first image, in step 106, according to the symbol, therefore obtaining a plurality of shifted first images, which may be temporarily stored in the storage device 13. The symbol is divided into segments, each of which is approximate to a straight line. The divided segments are then composed to trace the symbol. FIG. 4A illustrates an exemplary symbol 30 shown on the display unit 11, and FIG. 4B shows the first image 32A with a light spot 320. For illustration purposes, only the light spot 320 is shown, and only 5×5 pixels are depicted. In the example, the symbol 30 is a line segment that extends from (5,1) to (3,3), and the light spot 320 is at (5,1). FIG. 4C shows three shifted first images 32A, 32B, 32C in an overlapping viewpoint, and FIG. 4D shows all the shifted first images 32A, 32B, 32C in a non-overlapping viewpoint. Specifically, the light spot on the shifted first image 32A is used to trace a top-right portion of the symbol 30 at (5,1). The shifted first images 32B has a light spot located at (4,2), which is thus used to trace a middle portion of the symbol 30 at (4,2). The shifted first image 32C of the shifted first images has its light spot located at (3,3), which is thus used to trace a bottom-left portion of the symbol 30 at (3,3).

Still referring to FIG. 2, in step 107, all of the shifted first images, for example, 32A/32B/32C are superimposed by computing the brightness values of corresponding pixels of the shifted first images by the computing center 14, to produce a second image with a light track that traces the symbol. In the embodiment, the brightness values of the corresponding pixels of the shifted first images are firstly multiplied with respective weightings, followed by adding the multiplied brightness values with respect to the corresponding pixels of the shifted first images. The added brightness values are commonly averaged. For example, if n pieces of the first images are superimposed, the added brightness values are divided by n. It is noted that the respective weightings may be different from each other. The computation may be expressed, in general, as follows:

$$S_{x,y} = \sum_{z=1}^{n} w_z \cdot F_{x,y,z}$$

where $w_z$ is the weighting of z-th shifted first image, $F_{x,y,z}$ is the brightness value of the pixel (x,y) of z-th shifted first image, $S_{x,y}$ is the brightness value of the pixel (x,y) of the second image, and n is the total number of the shift first images.

In a case that the symbol contains hundreds or thousands of pixels, the computing center 14 needs a substantive time to perform the computation in step 107. In order to accelerate the computation, an alternative scheme for performing step 107 is disclosed as shown in FIG. 5.

Figure 5:
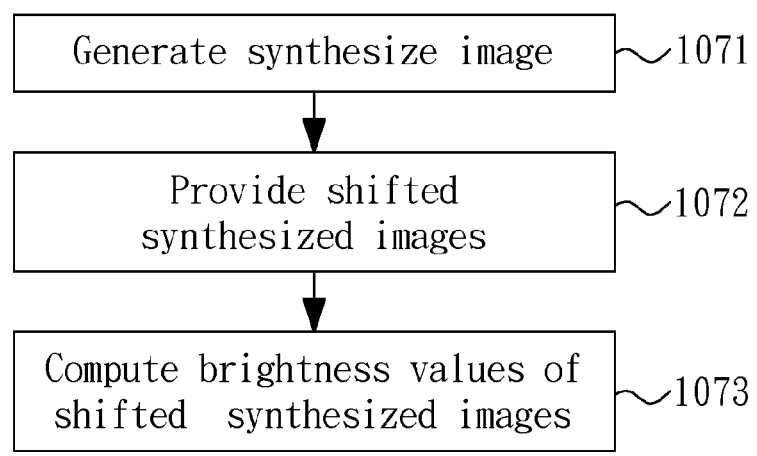
FIG. 5 shows a detailed flow diagram of the computation step in FIG. 2 according to an embodiment alternative to the first embodiment of the present invention.
Figure 6A:
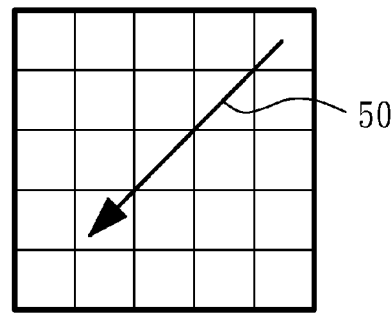
FIG. 6A shows an exemplary symbol.
Figure 6B:
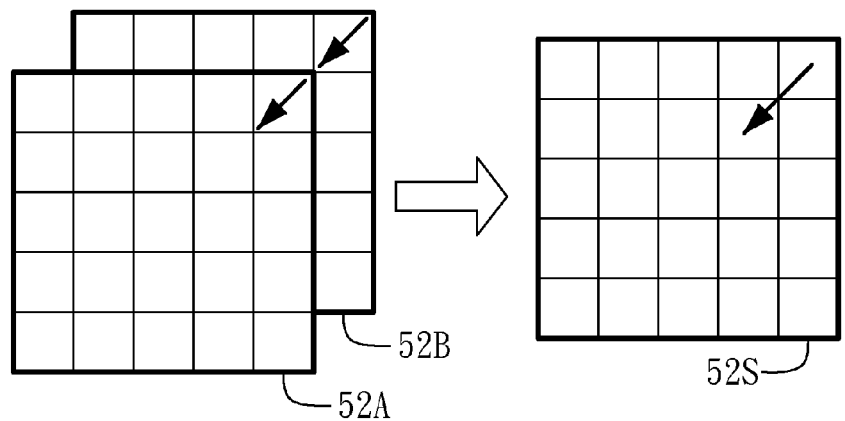
FIG. 6B shows two shifted first images and a resultant synthesized image.
Figure 6C:
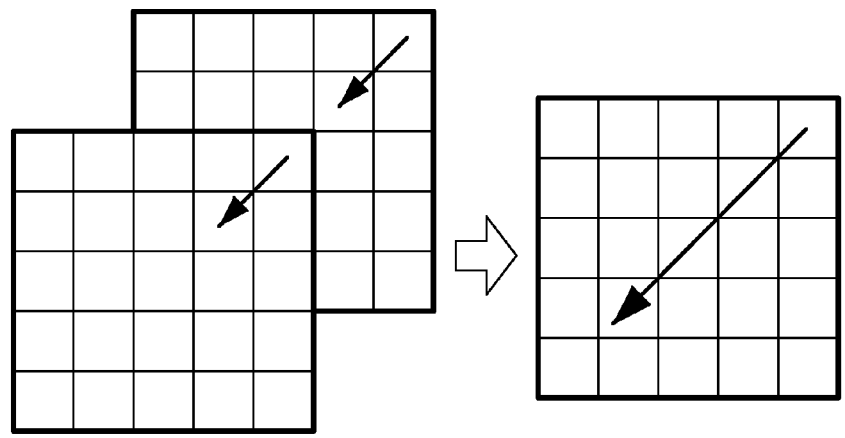
FIG. 6C shows two shifted synthesized images and a resultant second image.

Specifically, referring to FIG. 5, in step 1071, a synthesized image is generated by computing the brightness values of corresponding pixels of at least two shifted first images. FIG. 6A shows an exemplary symbol 50. FIG. 6B shows, on the left-hand side, two shifted first images 52A/52B, and shows, on the right-hand side, a resultant synthesized image 52S. Subsequently, in step 1072, based on the synthesized image 52S (rather than the first image), it is duplicated and shifted to provide a plurality of shifted synthesized images, as shown on the left-hand side in FIG. 6C, performed in a way similar to steps 104 and 106 as described above. Afterwards, in step 1073, all of the shifted synthesized images are superimposed pixel by pixel, and the brightness values of corresponding pixels of the shifted synthesized images are computed or averaged, by the computing center 14, to produce the second image, as shown on the right-hand side in FIG. 6C, performed in a way similar to step 107 as described above. Regarding the example demonstrated in FIGS. 6A-6C, only two superimpositions are required to produce the second image according to the flow of FIG. 5, while four superimpositions are needed according to the flow of FIG. 2. Accordingly, the computation of the brightness values is substantially accelerated.

Figure 7:
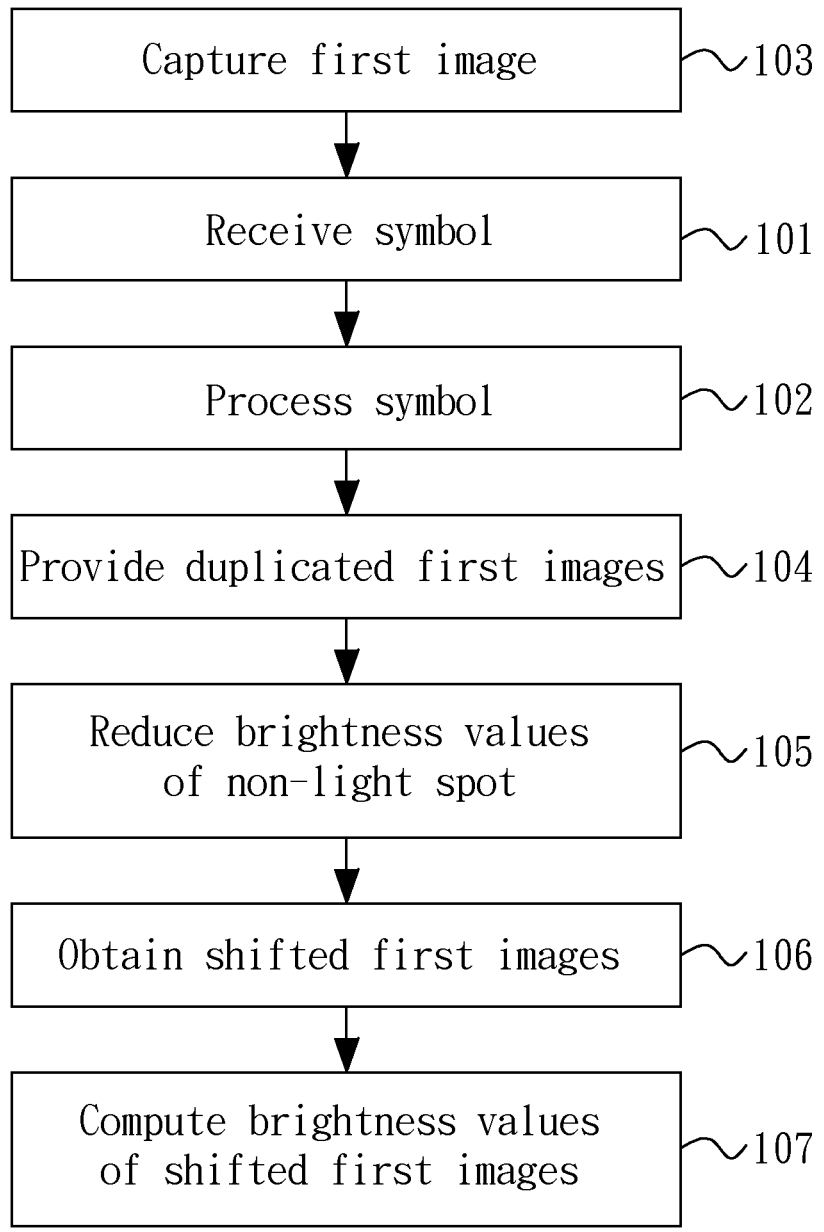
FIG. 7 shows a flow diagram illustrating a method of producing an image according to a second embodiment of the present invention.

FIG. 7 shows a flow diagram illustrating a method of producing an image according to a second embodiment of the present invention. The second embodiment is similar to the first embodiment, with the distinctness that step 103 for capturing the first image is performed before step 101 for receiving the symbol. Further, step 107 of the second embodiment may be replaced by steps 1071-1073 as illustrated in FIG. 5.

Figure 8:
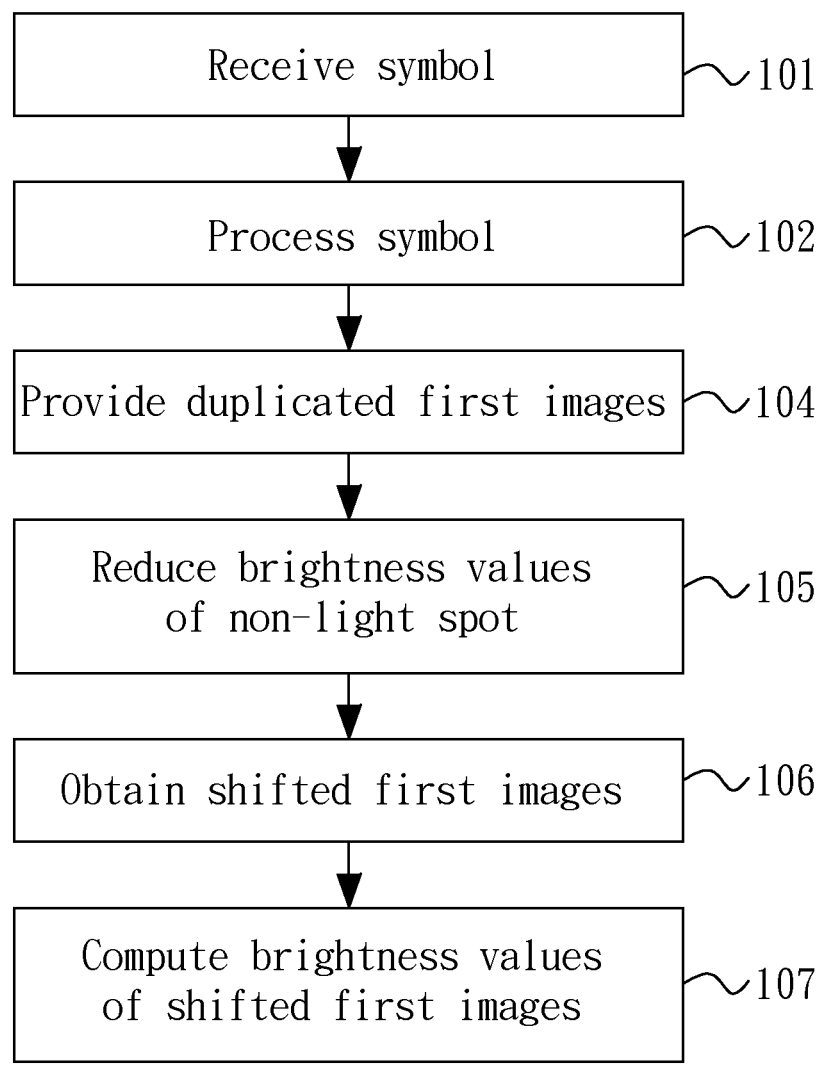
FIG. 8 shows a flow diagram illustrating a method of producing an image according to a third embodiment of the present invention.

FIG. 8 shows a flow diagram illustrating a method of producing an image according to a third embodiment of the present invention. The third embodiment is similar to the first embodiment, with the distinctness that step 103 for capturing the first image is not necessary in the third embodiment. Instead, the first image may be pre-provided, for example, by pre-storing the first image in the storage device 13. Further, step 107 of the third embodiment may be replaced by steps 1071-1073 as illustrated in FIG. 5.

Although specific embodiments have been illustrated and described, it will be appreciated by those skilled in the art that various modifications may be made without departing from the scope of the present invention, which is intended to be limited solely by the appended claims.

What is claimed is:

1. A method of producing an image, comprising:
   receiving at least one symbol;
   capturing a first image with at least one light spot by an image capturing apparatus;
   duplicating the first image to provide a plurality of duplicated first images;
   shifting the plurality of duplicated first images according to the at least one symbol to obtain a plurality of shifted first images; and
   computing brightness values of corresponding pixels of the shifted first images to produce a second image.

2. The method of claim 1, wherein the first image comprises at least one light spot, which includes at least one pixel with the brightness value greater than the brightness values of pixels of non-light spot portion of the first image.

3. The method of claim 1, wherein the computing step further comprises:
   multiplying the brightness values of the corresponding pixels of the shifted first images with respective weightings; and
   adding the multiplied brightness values with respect to the corresponding pixels of the shifted first image.

4. The method of claim 1, wherein the computing step further comprises:
   generating a synthesized image by computing brightness values of corresponding pixels of at least two said shifted first images; and
   duplicating and shifting the synthesized image to provide a plurality of shifted synthesized images according to the at least one symbol.

5. The method of claim 4, further comprising:
   averaging brightness values of corresponding pixels of the shifted synthesized images to produce the second image.

6. The method of claim 1, further comprising:
   reducing the brightness values of pixels of non-light spot portion of the first image.

7. The method of claim 1, further comprising:
   averaging the computed brightness values of corresponding pixels.

8. A method of producing an image, comprising:
   capturing a first image with at least one light spot by an image capturing apparatus;
   receiving at least one symbol;
   duplicating the first image to provide a plurality of duplicated first images;
   shifting the plurality of duplicated first images according to the at least one symbol to obtain a plurality of shifted first images; and
   computing brightness values of corresponding pixels of the shifted first images to produce a second image with a light track that traces the at least one symbol.

9. The method of claim 8, wherein the light spot of the first image comprises at least one pixel which has the brightness value greater than brightness values of pixels of non-light spot portion of the first image.

10. The method of claim 8, wherein the computing step further comprises:
    multiplying the brightness values of the corresponding pixels of the shifted first images with respective weightings; and
    adding the multiplied brightness values with respect to the corresponding pixels of the shifted first image.

11. The method of claim 8, wherein the computing step further comprises:
    generating a synthesized image by averaging brightness values of corresponding pixels of at least two said shifted first images; and
    duplicating and shifting the synthesized image to provide a plurality of shifted synthesized images according to the at least one symbol.

12. The method of claim 11, wherein the computing step further comprises:
    averaging brightness values of corresponding pixels of the shifted synthesized images to produce the second image.

13. The method of claim 8, further comprising:
    reducing brightness values of pixels of non-light spot portion of the first image.

14. The method of claim 8, further comprising:
    averaging the computed brightness values of corresponding pixels.

15. A method of producing an image, comprising:
    receiving at least one symbol;
    duplicating a first image to provide a plurality of duplicated first images;
    shifting the plurality of duplicated first images according to the at least one symbol to obtain a plurality of shifted first images; and
    computing brightness values of corresponding pixels of the shifted first images to produce a second image.

16. The method of claim 15, wherein the first image comprises at least one light spot, which includes at least one pixel with the brightness value greater than the brightness values of pixels of non-light spot portion of the first image.

17. The method of claim 15, wherein the computing step further comprises:
    multiplying the brightness values of the corresponding pixels of the shifted first images with respective weightings; and
    adding the multiplied brightness values with respect to the corresponding pixels of the shifted first image.

18. The method of claim 15, wherein the computing step further comprises:
    generating a synthesized image by averaging brightness values of corresponding pixels of at least two said shifted first images;
    duplicating and shifting the synthesized image to provide a plurality of shifted synthesized images according to the at least one symbol; and
    averaging brightness values of corresponding pixels of the shifted synthesized images to produce the second image.

19. The method of claim 15, further comprising:
    reducing brightness values of pixels of non-light spot portion of the first image.

20. The method of claim 15, further comprising:
    averaging the computed brightness values of corresponding pixels.

* * * * *